(12) United States Patent
Seki et al.

(10) Patent No.: US 8,085,322 B2
(45) Date of Patent: Dec. 27, 2011

(54) DEFECT PIXEL CORRECTION CIRCUIT, IMAGE PROCESSING SYSTEM USING THE SAME, AND DEFECT PIXEL CORRECTING METHOD

(75) Inventors: Takeshi Seki, Kasugai (JP); Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 853 days.

(21) Appl. No.: 11/907,872

(22) Filed: Oct. 18, 2007

(65) Prior Publication Data

US 2008/0100727 A1 May 1, 2008

(30) Foreign Application Priority Data

Oct. 30, 2006  (JP) ................. 2006-294268

(51) Int. Cl.
*H04N 9/64* (2006.01)
*G06K 9/40* (2006.01)
(52) U.S. Cl. ........................ 348/246; 382/260
(58) Field of Classification Search .................. 348/241, 348/246, 247, 250; 382/260
See application file for complete search history.

(56) References Cited

U.S. PATENT DOCUMENTS

| 6,408,109 B1* | 6/2002 | Silver et al. ................ 382/300 |
| 2004/0119856 A1* | 6/2004 | Nishio et al. ................ 348/246 |
| 2007/0024931 A1* | 2/2007 | Compton et al. ............ 358/512 |

FOREIGN PATENT DOCUMENTS

| JP | 04-304091 A | 10/1992 |
| JP | 2000-101924 A | 4/2000 |
| JP | 2002-223391 A | 8/2002 |
| JP | 2004-112802 A | 4/2004 |
| JP | 2004-235980 A | 8/2004 |
| JP | 2006-013988 A | 1/2006 |
| JP | 2006-026234 A | 2/2006 |

OTHER PUBLICATIONS

"Japanese Office Action" mailed by JPO and corresponding to Japanese application No. 2006294268 on Sep. 13, 2011, with English translation.

* cited by examiner

*Primary Examiner* — David Ometz
*Assistant Examiner* — Carramah J Quiett
(74) *Attorney, Agent, or Firm* — Fujitsu Patent Center

(57) ABSTRACT

A defect pixel correction circuit that can easily determine a defect of an image sensor that has the defect that ranges to one direction and replace with the correcting pixel is provided. The defect pixel correction circuit 1 includes: a defect pixel determination unit 10 configured to determine whether a noteworthy pixel oo is a defect pixel referring to a referring pixels ko, mo, qo and so that excludes the noteworthy pixel oo, the referring pixels centering on the noteworthy pixel oo and lining up in one direction; and a defect pixel correcting unit 20 configured to generate a correcting pixel value on the basis of the referring pixels mo and qo, and replace the noteworthy pixel value that is pixel value of the noteworthy pixel oo with the correcting pixel value, when the noteworthy pixel oo is a defect pixel.

11 Claims, 6 Drawing Sheets

FUNCTIONAL BLOCK DIAGRAM SHOWING CONFIGURATION OF DEFECT PIXEL DETERMINATION UNIT

FIG. 1 FUNCTIONAL BLOCK DIAGRAM SHOWING CONFIGURATION OF DEFECT PIXEL CORRECTION CIRCUIT ACCORDING TO FIRST EMBODIMENT

FIG. 2 FUNCTIONAL BLOCK DIAGRAM SHOWING CONFIGURATION OF DEFECT PIXEL DETERMINATION UNIT

FUNCTIONAL BLOCK DIAGRAM SHOWING CONFIGURATION OF DEFECT PIXEL CORRECTING UNIT

FLOW CHART (1) SHOWING PROCESSING PROCEDURE OF DEFECT PIXEL CORRECTING METHOD ACCORDING TO FIRST EMBODIMENT

FLOW CHART (2) SHOWING PROCESSING PROCEDURE OF DEFECT PIXEL CORRECTING METHOD ACCORDING TO FIRST EMBODIMENT

FUNCTIONAL BLOCK DIAGRAM SHOWING CONFIGURATION OF IMAGE PROCESSING SYSTEM ACCORDING TO SECOND EMBODIMENT

DEFECT PIXEL CORRECTION CIRCUIT, IMAGE PROCESSING SYSTEM USING THE SAME, AND DEFECT PIXEL CORRECTING METHOD

CROSS-REFERENCE TO RELATED APPLICATIONS

This application is based upon and claims the benefit of priority from each of the prior Japanese Patent Application No. 2006-294268 filed on Oct. 30, 2006, the entire contents of which are incorporated herein by reference.

BACKGROUND

1. Field

It is related to a defect pixel correction circuit for correcting a defect of an image sensor such as CCD/CMOS sensor digitally, a system using the same, and a defect pixel correcting method.

2. Description of Related Art

In general, it is known that the defect pixel occurs due to a partial crystal defect etc. of a semiconductor substrate in image sensors such as CCD (Charge Coupled Device) and CMOS sensors.

When the defect pixel of such an image sensor is determined and corrected, it is determined whether a noteworthy pixel is defected from a peripheral referring pixel by using the sub matrix of n×n (where n≧2, generally about n=3). When the noteworthy pixel is a defect pixel, the noteworthy pixel is replaced by the correcting pixel generated by using the peripheral referring pixel.

The technique concerning defect pixel correction of such an image sensor is disclosed in Japanese Unexamined Patent Publication No. 2000-101924, Japanese Unexamined Patent Publication No. 2004-235980 and Japanese Unexamined Patent Publication No. 2002-223391.

However, there is the defect that ranges to one direction (for example, vertical direction) in the image sensor in recent years, and a lot of defect pixels will be included in the referring pixel in the technique concerning the defect pixel correction that uses the sub matrix of n×n of the conventional technology. Therefore, the determination of the defect of the image sensor with the defect that ranges to such one direction and the appropriate replacement with the correcting pixel are difficult and problems in the conventional technology.

SUMMARY

In the background art, a defect pixel correction circuit is provided that could easily determine the defect of the image sensor that has the defect that ranges to one direction and easily replace it with the correcting pixel.

To achieve the above object, a defect pixel correction circuit is provided which comprises a defect pixel determination unit configured to determine whether a noteworthy pixel is a defect pixel referring to a referring pixel group that excludes the noteworthy pixel, the referring pixel group centering on the noteworthy pixel and lining up in one direction; and a defect pixel correcting unit configured to generate a correcting pixel value on the basis of the referring pixel group, and replace the noteworthy pixel value that is pixel value of the noteworthy pixel with the correcting pixel value, when the noteworthy pixel is a defect pixel.

According to another aspect, a defect pixel correcting method is provided which comprises the steps of: determining whether a noteworthy pixel is a defect pixel referring to a referring pixel group that excludes the noteworthy pixel, the referring pixel group centering on the noteworthy pixel and lining up in one direction; generating a correcting pixel value on the basis of the referring pixel group when the noteworthy pixel is a defect pixel; and replacing the noteworthy pixel value that is pixel value of the noteworthy pixel with the correcting pixel value.

According to defect pixel correction circuit and defect pixel correcting method, when the direction where the noteworthy pixel and the referring pixel group line up and the direction where the defect pixel lines up intersect, the possibility that the defect pixel is included in the referring pixel is reduced. As a result, when the noteworthy pixel is a defect pixel, this pixel value can be appropriately replaced with the correcting pixel value.

According to another aspect, an image processing system is provided which comprises an exposure evaluation unit configured to evaluate an exposure value from an output of an image sensor, and set up an ISO sensibility; and a defect pixel determination unit configured to determine whether a noteworthy pixel is a defect pixel referring to a referring pixel group that excludes the noteworthy pixel, the referring pixel group centering on the noteworthy pixel and lining up in one direction; and wherein in the case where the noteworthy pixel is placed among the referring pixel group, one side is made a first referring pixel group, and the other side is made a second referring pixel group, the defect pixel determination unit comprises: a first guess pixel value generation unit to which the first guess pixel value that is guess value of the noteworthy pixel value is guessed from at least two pixel value of the first referring pixel group by the collinear approximation; a second guess pixel value generation unit to which the second guess pixel value that is guess value of the noteworthy pixel value is guessed from at least two pixel value of the second referring pixel group by the collinear approximation; a first maximum value acquiring unit configured to extract a maximum value from among the first guess pixel value and the second guess pixel value; a first minimum value acquiring unit configured to extract a minimum value from among the first guess pixel value and the second guess pixel value; a second maximum value acquiring unit configured to extract a maximum value from among the referring pixel group; a second minimum value acquiring unit configured to extract a minimum value from among the referring pixel group; a third maximum value acquiring unit configured to extract a maximum value from among as a result of the first maximum value acquiring unit and as a result of the second maximum value acquiring unit; a third minimum value acquiring unit configured to extract a minimum value from among as a result of the first minimum value acquiring unit and as a result of the second minimum value acquiring unit; a maximum value selection unit configured to select as a result of the first maximum value acquiring unit, as a result of the second maximum value acquiring unit and as a result of the third maximum value acquiring unit as a pixel maximum value according to the ISO sensibility; a minimum value selection unit configured to select as a result of the first minimum value acquiring unit, as a result of the second minimum value acquiring unit and as a result of the third minimum value acquiring unit as a pixel minimum value according to the ISO sensibility; a maximum threshold generation unit configured to add a first threshold to the pixel maximum value; a minimum threshold generation unit configured to decrease a second threshold from the pixel minimum value; and a defect determination unit configured to determine whether the noteworthy pixel value is included from as a result of the maximum threshold generation unit to as a result of the minimum threshold generation unit.

According to another aspect, an image processing system is provided which comprises an exposure evaluation unit configured to evaluate an exposure value from an output of an image sensor, and set up an ISO sensibility; and a defect pixel correcting unit configured to generate a correcting pixel value on the basis of a referring pixel group, and replace a noteworthy pixel value that is pixel value of the noteworthy pixel with the correcting pixel value, when the noteworthy pixel is a defect pixel; and wherein the defect pixel correcting unit comprises: an average value operation unit configured to operate an average value of the referring pixel group; a maximum value acquiring unit configured to acquire a maximum value from the referring pixel group; a minimum value acquiring unit configured to acquire a minimum value from the referring pixel group; a selection unit configured to select the maximum value of the referring pixel group when the noteworthy pixel value is more than the maximum value of the determination by the defect pixel determination unit, and select the minimum value of the referring pixel group when the noteworthy pixel value is less than the minimum value of the determination by the defect pixel determination unit; and a correction factor selection unit configured to select as a result of the average value operation unit and as a result of the selection unit as the correcting pixel value according to the ISO sensibility.

The correction factor selection unit of the defect pixel correcting unit is set according to the detected ISO sensibility. Therefore, an appropriate defect pixel can be corrected to the image to which the ISO sensibility is high and rough and the image that the ISO sensibility is low and smooth.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereafter, the embodiments embodied about a defect pixel correction circuit and an image processing system according to the embodiment will be explained in detail referring to FIGS. 1 to 6.

First Embodiment

Figure 1:
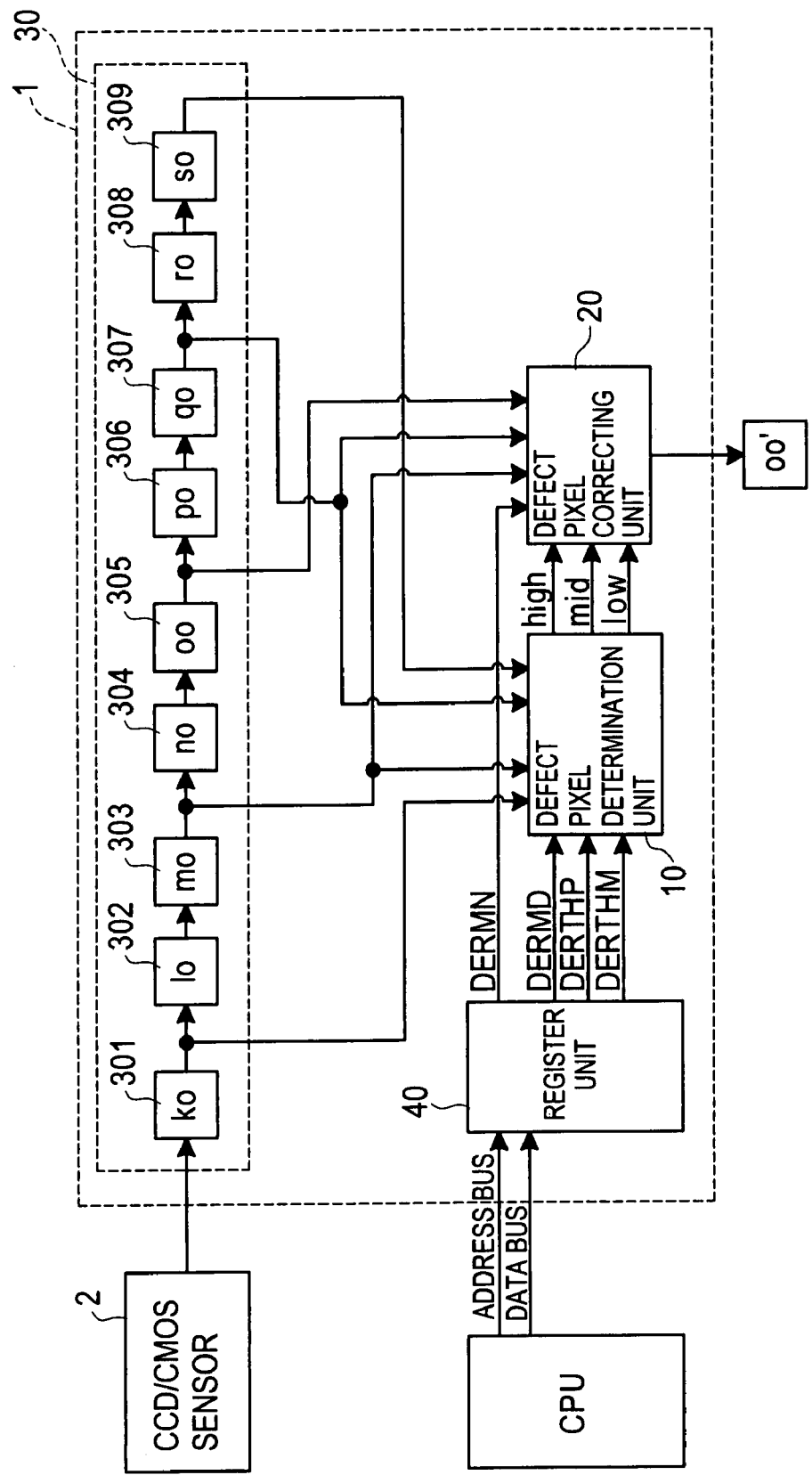
FIG. 1 is a functional block diagram showing a configuration of a defect pixel correction circuit according to the first embodiment.

FIG. 1 is a functional block diagram showing a configuration of a defect pixel correction circuit 1 according to the first embodiment. In the defect pixel correction circuit 1, pixel values of the pixels of the bayer array from a CCD/CMOS sensor is input to a buffer unit 30 in serial, peripheral same color referring pixel ko, mo, qo, and so are referred to, and it is determined whether or not a noteworthy pixel oo at the center of the buffer unit 30 is a defect pixel. As a result of determination, if the noteworthy pixel oo is a defect pixel, the pixel value of the noteworthy pixel oo is replaced by a correcting pixel value generated on the basis of the pixel value of same color of the vicinity referring pixel mo and qo.

Here, the defect pixel is a pixel that occurs in an image sensor formed on a semiconductor substrate due to a local crystal defect on the semiconductor substrate etc. The pixel value of the defect pixel is large or small more then usually compared with the pixel value of referring pixel group in the perimeter. In addition, it is also possible that the defect pixel correction circuit 1 according to the first embodiment functions as a noise filter by setting for the direction where the width of the thresholds described later (a first threshold DERTHM and a second threshold DERTHP) to detect whether it is an unexpected value is narrowed.

The defect pixel correction circuit 1 includes a defect pixel determination unit 10, a defect pixel correcting unit 20, a buffer unit 30 and a register unit 40. The defect pixel determination unit 10 determines whether or not the noteworthy pixel oo is a defect pixel. The defect pixel correcting unit 20 corrects the pixel value of the noteworthy pixel oo when the noteworthy pixel oo is a defect pixel. The buffer unit 30 holds the pixel value sent from the CCD/CMOS sensor 2 sequentially. The register unit 40 holds various parameters set by a CPU 3.

In defect pixel determination unit 10 among these, the value of the reference pixel ko, mo, qo, and so is input from the buffer unit 30, and a discrimination mode DERMD, a first threshold DERTHM, and a second threshold DERTHP are input from the register unit 40. In addition, determination signals high, mid, and low are output to the defect pixel correcting unit 20 from the defect pixel determination unit 10.

The discrimination mode DERMD input to the defect pixel determination unit 10 includes three kinds of modes of 0, 1 and 2. The Minimum value and the maximum value are selected from among the referring pixels ko, mo, qo and so when the discrimination mode DERMD is set to 1, the first threshold DERTHM is subtracted from the minimum value, and the second threshold DERTHP is added to the maximum value. Noteworthy pixel oo is determined as no defect pixel when the noteworthy pixel oo is equal to or more than the result that the first threshold DERTHM is subtracted from minimum value and the noteworthy pixel oo is equal to or less than the result that the second threshold DERTHP is added to maximum value. Moreover, it may contain the value of both ends, and it is not necessary to contain the value of both ends.

When the discrimination mode DERMD is set to 2, the guess value of the pixel value of the noteworthy pixel oo is guessed respectively by the straight line that connects the referring pixels ko and mo and the straight line that connects the referring pixels qo and so, and, in addition, the minimum value and the maximum value are selected from among each guess value. Moreover, the first threshold DERTHM is subtracted from the minimum value, and the second threshold DERTHP is added to the maximum value. When the noteworthy pixel oo is included in the interval of the result that the first threshold DERTHM is subtracted from the minimum value and the result that the second threshold DERTHP is added to the maximum value, the noteworthy pixel oo is determined as no defect pixel.

When the discrimination mode DERMD is set to 0, the pixel value of the noteworthy pixel oo is guessed respectively by the straight line that connects the referring pixels ko and mo and the straight line that connects the referring pixels qo and so, and, in addition, the minimum value and the maximum value are selected from among each guess value and the referring pixels ko, mo, qo and so. Moreover, the first threshold DERTHM is subtracted from the minimum value, and the second threshold DERTHP is added to the maximum value. When the noteworthy pixel oo is included in the interval of the result that the first threshold DERTHM is subtracted from the minimum value and the result that the second threshold DERTHP is added to the maximum value, the noteworthy pixel oo is determined as no defect pixel.

In the case of the discrimination mode DERMD is set to 0 or 2, a left guess value SL guessed from the referring pixels ko and mo of the noteworthy pixel oo and a right guess value SR guessed from the referring pixel qo and so are calculated by using the following equations:

$$\text{Left guess value } SL = ko + 2 \times (mo - ko) \quad (1)$$

$$\text{Right guess value } SR = so + 2 \times (qo - so) \quad (2)$$

Figure 2:
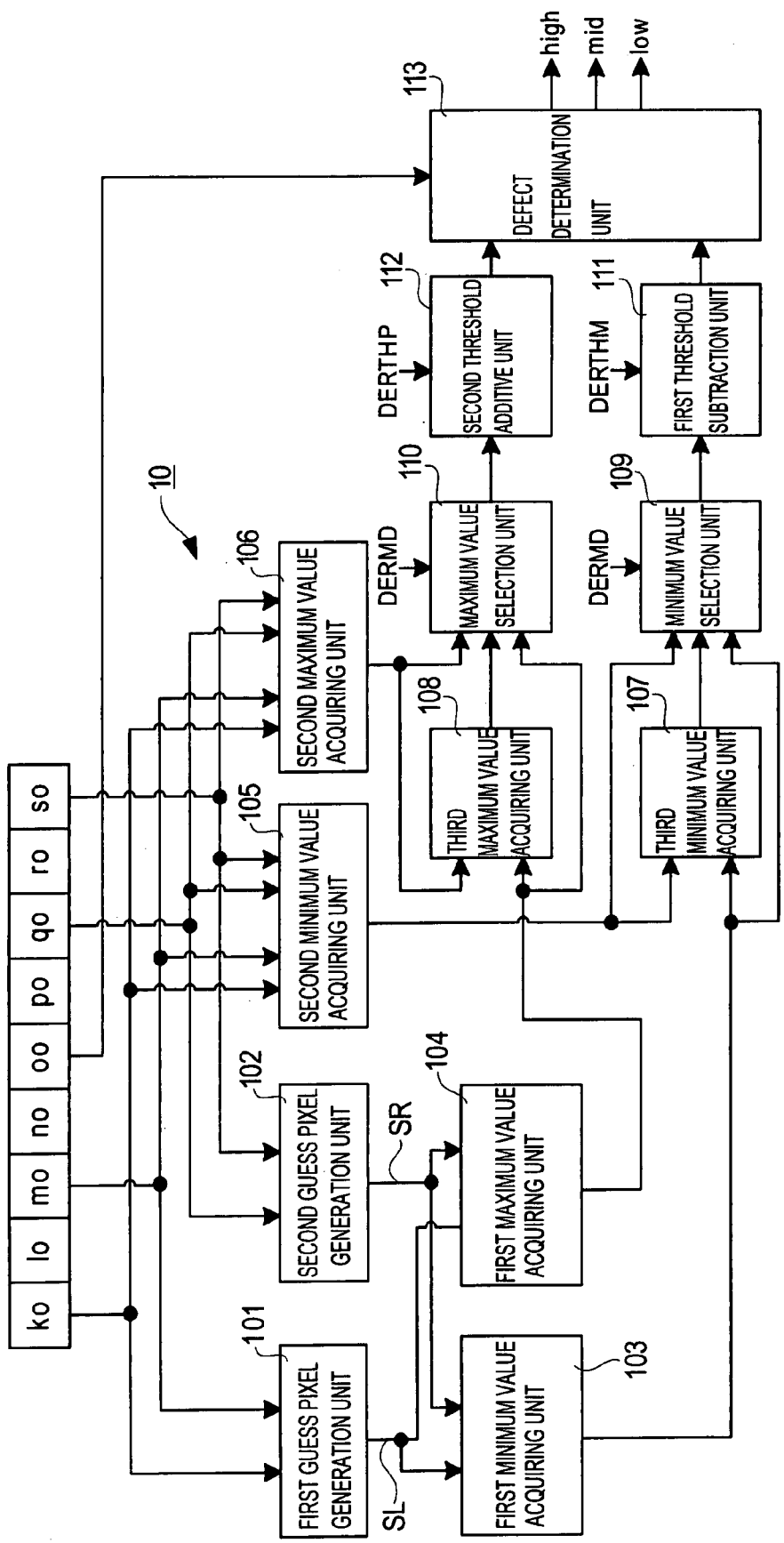
FIG. 2 is a functional block diagram showing a configuration of a defect pixel determination unit.

FIG. 2 is a functional block diagram showing a configuration of the defect pixel determination unit 10. The defect pixel determination unit 10 includes a first guess pixel generation unit 101, a second guess pixel generation unit 102, a first minimum value acquiring unit 103, a first maximum value acquiring unit 104, a second minimum value acquiring unit 105, a second maximum value acquiring unit 106, a third minimum value acquiring unit 107, a third maximum value acquiring unit 108, a minimum value selection unit 109, a maximum value selection unit 110, a first threshold subtraction unit 111, a second threshold additive unit 112, and a defect determination unit 113.

The first guess pixel generation unit 101 includes a subtracter, a multiplier, and an adder. The first guess pixel generation unit 101 generates the left guess value SL on the basis of the equation (1).

The second guess pixel generation unit 102 contains subtracter, multipliers, and the adder. The second guess pixel generation unit 102 generates right guess value SR on the basis of equation (2).

In the first minimum value acquiring unit 103, sizing of the value of the left guess value SL and the right guess value SR are compared, and the minimum value is output from the comparison result.

In the first maximum value acquiring unit 104, sizing of the value of the left guess value SL and the right guess value SR are compared, and the maximum value is output from the comparison result.

In the second minimum value acquiring unit 105, sizing of the value of the referring pixels ko, mo, qo and so are compared, and the minimum value is output from the comparison result.

In the second maximum value acquiring unit 106, sizing of the value of the referring pixels ko, mo, qo and so are compared, and the maximum value is output from the comparison result.

In the third minimum value acquiring unit 107, sizing of the value of the output of the first minimum value acquiring unit 103 and the output of the second minimum value acquiring unit 105 are compared, and the minimum value is output from the comparison result.

In the third maximum value acquiring unit 108, sizing of the value of the output of the first maximum value acquiring unit 104 and the output of the second maximum value acquiring unit 106 are compared, and the maximum value is output from the comparison result.

In the minimum value selection unit 109, the output is selected according to the discrimination mode DERMD. More specifically, the output of the third minimum value acquiring unit 107 is selected when the discrimination mode DERMD is set to 2, the output of the first minimum value acquiring unit 103 is selected when the discrimination mode DERMD is set to 0, and the output of the second minimum value acquiring unit 105 is selected when the discrimination mode DERMD is set to 1.

In the maximum value selection unit 110, the output is selected according to the discrimination mode DERMD. More specifically, the output of the third maximum value acquiring unit 108 is selected when the discrimination mode DERMD is set to 2, the output of the first maximum value acquiring unit 104 is selected when the discrimination mode DERMD is set to 0, and the output of the second maximum value acquiring unit 106 is selected when the discrimination mode DERMD is set to 1.

In the first threshold subtraction unit 111, the first threshold DERTHM is subtracted from the output value of the minimum value selection unit 109. At this time, when the subtracting result is negative, 0 is compulsorily output.

In the second threshold additive unit 112, the second threshold DERTHP is added to the output value of the maximum value selection unit 110. At this time, when the additive as a result exceeds the maximum value of the pixel (it is 4095 in the present embodiment), the maximum value of the pixel (it is 4095 in the present embodiment) is compulsorily output.

In the defect determination unit 113, the pixel value of the noteworthy pixel oo is determined whether to be included in the bound from the output of the first threshold subtraction unit 111 to the output of the second threshold additive unit 112. The determination signal mid is activated when the pixel value of the noteworthy pixel oo is in the bound from output of the first threshold subtraction unit 111 to the output of the second threshold additive unit 112. Moreover, the determination signal low is activated when the pixel value of the noteworthy pixel oo is less than the output value of the first threshold subtraction unit 111. Furthermore, the determination signal high is activated when the pixel value of the noteworthy pixel oo is more than the output value of the second threshold subtraction unit 112.

Moreover, the determination signal mid may be activated when the pixel value of the noteworthy pixel oo is more than the output of the first threshold subtraction unit 111 and is less than the output of the second threshold additive unit 112. In this case, the determination signal low is activated when the pixel value of the noteworthy pixel oo is less than the output value of the first threshold subtraction unit 111. Furthermore, the determination signal high is activated when the pixel value of the noteworthy pixel oo is equal to or more than the output value of the second threshold subtraction unit 112.

Returning to FIG. 1, the defect pixel correcting unit 20 will be explained. In the defect pixel correcting unit 20, the determination signal high, mid and low from the defect pixel determination unit 10, the correcting mode DERMN from the register unit 40, the referring pixels mo and qo adjoined in bayer data by the same color as the noteworthy pixel oo, and the noteworthy pixel oo are input.

The correcting mode DERMN input to defect pixel correcting unit 20 includes two kinds of modes of 0 and 1. In the case of the correcting mode DERMN is set to 0, when determination signal low is activated, the minimum value is output as a correction factor of the noteworthy pixel oo from among the referring pixels mo and qo that the same color is adjoined in the bayer data. In the case of the correcting mode DERMN is equal to 0, when the determination signal high is activated, the maximum value is output as a correction factor of the noteworthy pixel oo from among the referring pixels mo and qo that the same color is adjoined in the bayer data. Moreover, in the case of the correcting mode DERMN is set to 1, the average value of the referring pixels mo and qo that the same color as the noteworthy pixel oo is adjoined in the bayer data is output as a correction factor of the noteworthy pixel oo.

Figure 3:
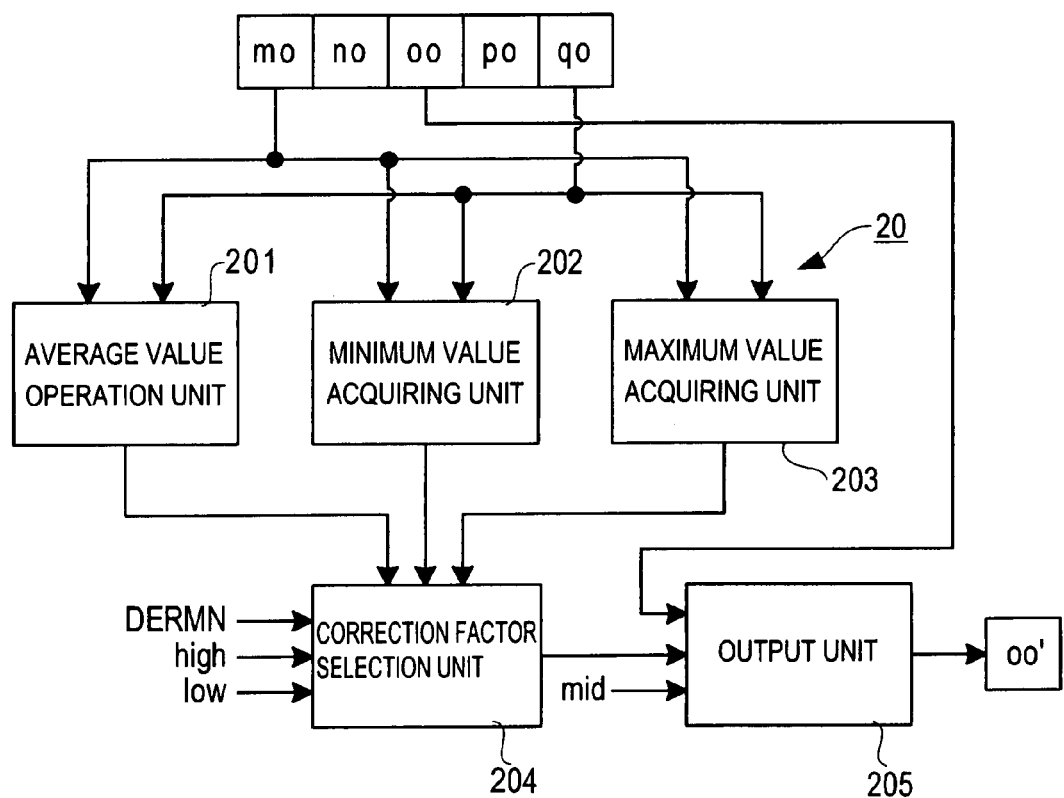
FIG. 3 is a functional block diagram showing a configuration of a defect pixel correcting unit.

FIG. 3 is a functional block diagram showing a configuration of the defect pixel correcting unit 20. The defect pixel correcting unit 20 includes an average value operation unit 201, a minimum value acquiring unit 202, a maximum value acquiring unit 203, and a correction factor selection unit 204 and an output unit 205.

The average value operation unit 201 includes an adder and a divider. In the average value operation unit 201, the average value of the referring pixels mo and qo that the same color as noteworthy pixel oo is adjoined in the bayer data is operated and then output.

In the minimum value acquiring unit 202, the minimum value is selected and output from among the referring pixels mo and qo that the same color as noteworthy pixel oo is adjoined in the bayer data.

In the maximum value acquiring unit 203, the maximum value is selected and output from among the referring pixels mo and qo that the same color as noteworthy pixel oo is adjoined in the bayer data.

In the correction factor selection unit 204, in the case of the correcting mode DERMN is set to 0, when the determination signal low is activated, the output value of the minimum value acquiring unit 202 is selected. In the case of the correcting mode DERMN is equal to 0, when the determination signal high is activated, the output value of the maximum value acquiring unit 203 is selected. Moreover, in the case of the correcting mode DERMN is set to 1, the output value of the average value operation unit 201 is selected.

In the output unit 205, the value of noteworthy pixel oo is output when the determination signal mid is activated, and the output value of the correction factor selection unit 204 is output when the determination signal mid is deactivated.

Returning to FIG. 1, the buffer unit 30 will be explained. In the buffer unit 30, flip-flops 301 to 309 are sequentially connected by configuring the shift register. From among those, the output of the flip-flop 301 is extracted as a pixel value of the referring pixel ko, the output of the flip-flop 303 is extracted as a pixel value of the referring pixel mo, the output of the flip-flop 305 is extracted as a pixel value of the noteworthy pixel oo, the output of the flip-flop 307 is extracted as a pixel value of the referring pixel qo, and the output of the flip-flop 309 is extracted as a pixel value of the referring pixel so.

In the register unit 40, each value of the correcting mode DERMN, the discrimination mode DERMD, the first threshold DERTHM, and the second threshold DERTHP is held. The access to each value is executed from the CPU 3 through the address bus and the data bus.

Figure 4:
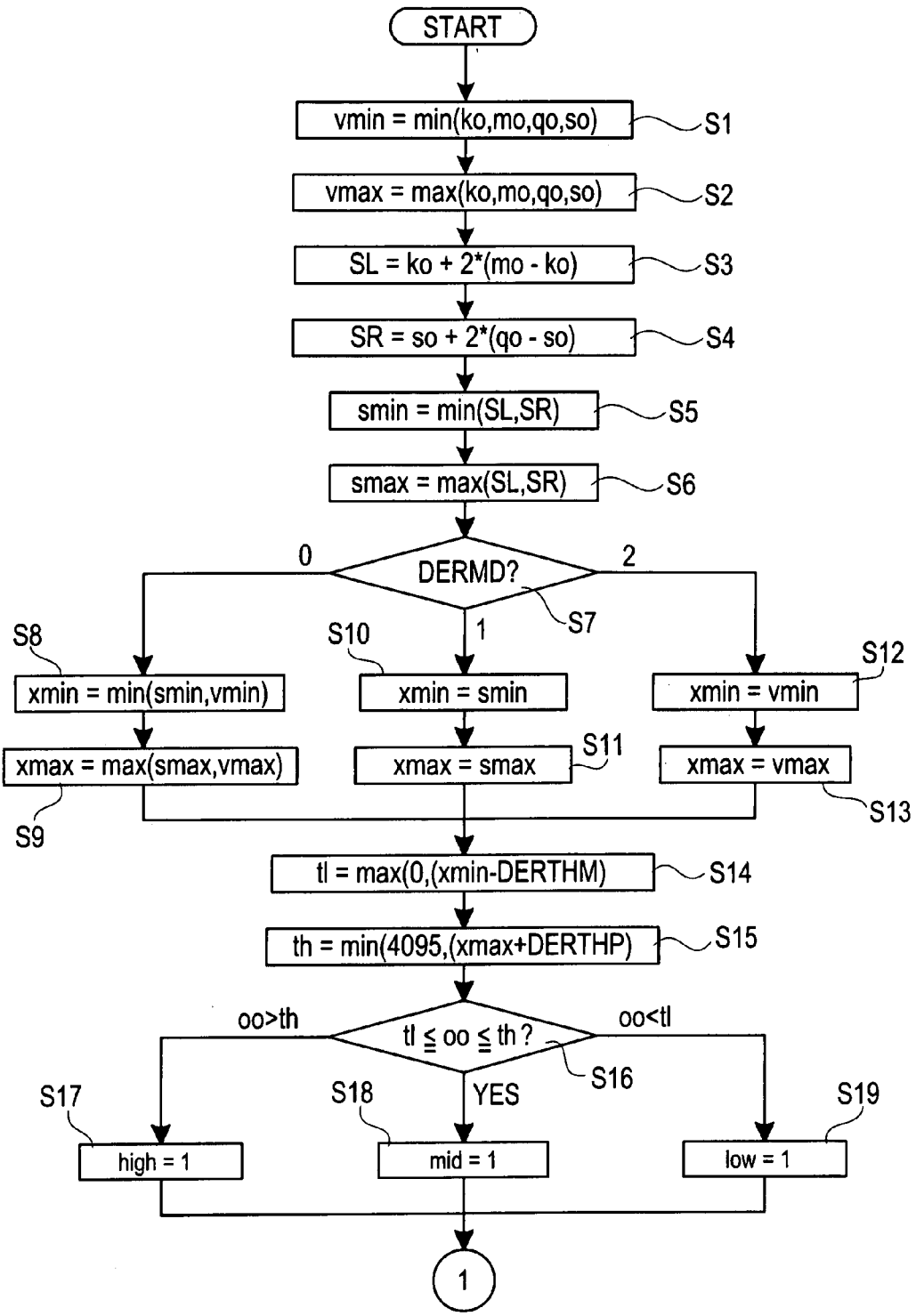
FIG. 4 is flow chart (1) showing a processing procedure of a defect pixel correcting method according to the first embodiment.
Figure 5:
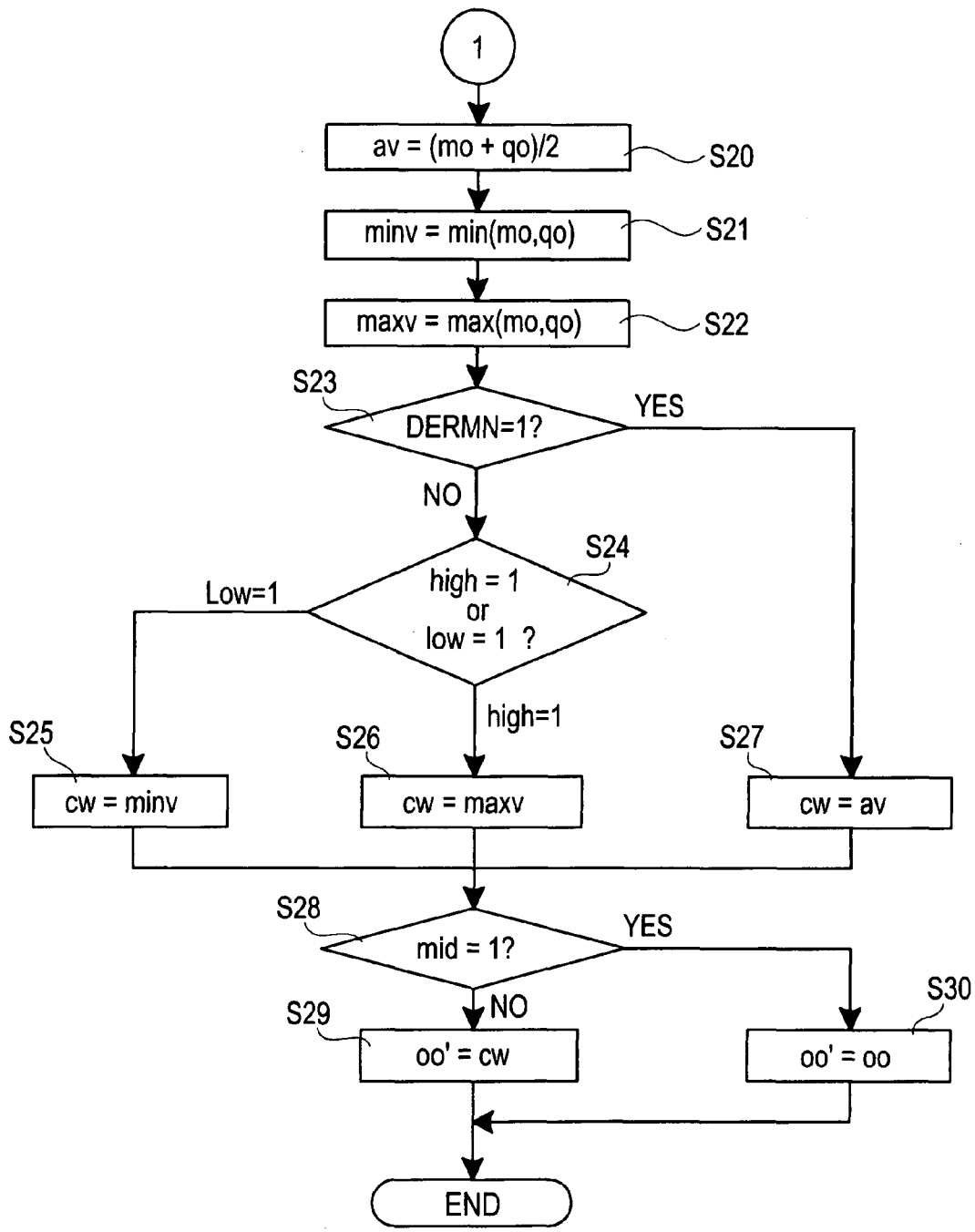
FIG. 5 is flow chart (2) showing a processing procedure of the defect pixel correcting method according to the first embodiment.

Next, a defect pixel correcting method according to the first embodiment will be explained referring to FIG. 4 and FIG. 5. FIG. 4 is a flow chart (1) showing a processing procedure of the defect pixel correcting method according to the first embodiment, and is a part that corresponds to the defect pixel determination unit 10 in the defect pixel correction circuit 1. FIG. 5 is a flow chart (2) showing a processing procedure of the defect pixel correcting method according to the first embodiment, and is a part that corresponds to the defect pixel correcting unit 20 in the defect pixel correction circuit 1.

In step S1, the minimum value is selected from the referring pixels ko, mo, qo and so, and is substituted for variable vmin. The min function shown in the flow chart is a function for selecting the minimum value from among the argument. This processing is a part that corresponds to the second minimum value acquiring unit 105 in the defect pixel determination unit 10.

In step S2, the maximum value is selected from the referring pixels ko, mo, qo and so, and is substituted for variable vmax. The max function shown in the flow chart is a function for selecting the maximum value from among the argument. This processing is a part that corresponds to the second maximum value acquiring unit 106 in the defect pixel determination unit 10.

In step S3, the left guess value SL is operated on the basis of the equation (1). This processing is a part that corresponds to the first guess pixel generation unit 101 in the defect pixel determination unit 10.

In step S4, the right guess value SR is operated on the basis of the equation (2). This processing is a part that corresponds to the second guess pixel generation unit 102 in the defect pixel determination unit 10.

In step S5, the minimum value is selected from the left guess value SL and the right guess value SR, and is substituted for variable smin. This processing is a part that corresponds to the first minimum value acquiring unit 103 in the defect pixel determination unit 10.

In step S6, the maximum value is selected from the left guess value SL and the right guess value SR, and is substituted for variable smax. This processing is a part that corresponds to the first maximum value acquiring unit 104 in the defect pixel determination unit 10.

In step S7, the value of the discrimination mode DERMD is determined. It goes to step S10 when the discrimination mode DERMD is set to 0, it goes to step S12 when the discrimination mode DERMD is set to 1, and it goes to step S8 when the discrimination mode DERMD is set to 2.

In step S8, the minimum value is selected from the variable smin and the variable vmin, and is substituted for variable xmin.

In step S9, the maximum value is selected from the variable smax and the variable vmax, and is substituted for variable xmax. And then, it goes to step S14.

In step S10, the variable smin is substituted for variable xmin.

In step S11, the variable smax is substituted for variable xmax. And then, it goes to step S14.

In step S12, the variable vmin is substituted for variable xmin.

In step S13, the variable vmax is substituted for variable xmax. And then, it goes to step S14.

In the above-mentioned processing of steps S7 to S13, the step S7, the step S8, the step S10 and the step S12 are parts that correspond to the minimum value selection unit 109 in the defect pixel determination unit 10, and the step S7, the step S9, the step S11 and the step S13 are parts that correspond to the maximum value selection unit 110 in the defect pixel determination unit 10.

In step S14, the maximum value is selected from among the result that the first threshold DERTHM is subtracted from the variable xmin and 0, and is substituted for variable t1. That is, even if the result that the first threshold DERTHM is subtracted from the variable xmin becomes negative, the value substituted for variable t1 becomes 0 with the clip it. This processing is a part that corresponds to the first threshold subtraction unit 111 in the defect pixel determination unit 10.

In step S15, the minimum value is selected from among the result that the second threshold DERTHP is added to the variable xmax and the maximum value of the pixel (it is 4095 in the present embodiment), and is substituted for variable th. That is, even if the result that the second threshold DERTHP is added to the variable xmax exceeds the maximum value of the pixel (it is 4095 in the present embodiment), the value substituted for the variable th becomes the maximum value of the pixel (it is 4095 in the present embodiment) with the clip it. This processing is a part that corresponds to the second threshold additive unit 112 in the defect pixel determination unit 10.

In step S16, the noteworthy pixel oo, the variable t1, and the variable th are compared. As a result of comparing, it goes to step S17 when the noteworthy pixel oo is more than the variable th, it goes to step S18 when the noteworthy pixel oo is equal to or more than the variable t1 and the noteworthy pixel oo is equal to or less than the variable th, and it goes to step S19 when the noteworthy pixel oo is less than the variable t1.

In step S17, the determination signal high is activated to 1. And then, it goes to step S20.

In step S18, the determination signal mid is activated to 1. And then, it goes to step S20.

In step S19, the determination signal low is activated to 1. And then, it goes to step S20.

In addition, the above-mentioned processing of steps S16 to S19 is a part that corresponds to the defect determination unit 113 in the defect pixel determination unit 10.

Referring to FIG. 5, in step S20, the average value of the referring pixels mo and qo is operated, and is substituted for variable av. This processing is a part that corresponds to average value operation unit 201 in the defect pixel correcting unit 20.

In step S21, the minimum value is selected from among the referring pixels mo and qo, and is substituted for variable minv. This processing is a part that corresponds to the minimum value acquiring unit 202 in the defect pixel correcting unit 20.

In step S22, the maximum value is selected from among the referring pixels mo and qo, and is substituted for variable maxv. This processing is a part that corresponds to the maximum value acquiring unit 203 in the defect pixel correcting unit 20.

In step S23, Whether or not the correcting mode DERMN is set to 1 is determined. It goes to step S27 when the correcting mode DERMN is set to 1, and it goes to step S24 when the correcting mode DERMN is not equal to 1.

In step S24, whether the determination signal high is set to 1 or the determination signal low is set to 1 is determined. It goes to step S25 when the determination signal low is set to 1, and it goes to step S26 when the determination signal high is set to 1.

In step S25, the variable minv is substituted for variable cw. Afterwards, it goes to step S28.

In step S26, the variable maxv is substituted for variable cw. Afterwards, it goes to step S28.

In step S27, the variable av is substituted for variable cw. Afterwards, it goes to step S28.

In addition, the above-mentioned processing of steps S24 to S27 is a part that corresponds to the correction factor selection unit 204 in the defect pixel correcting unit 20.

In step S28, whether or not the determination signal mid is set to 1 is determined. It goes to step S30 when the determination signal mid is set to 1, and it goes to step S29 when the determination signal mid is not equal to 1.

In step S29, the variable cw is substituted for the pixel value of output of the noteworthy pixel oo'. Afterwards, the processing of the defect pixel correcting is completed.

In step S30, the pixel value of the noteworthy pixel oo is substituted for the pixel value of output of the noteworthy pixel oo'. Afterwards, the processing of the defect pixel correcting is completed.

The above-mentioned processing of steps S28 to S30 is a part that corresponds to the output unit 205 in the defect pixel correcting unit 20.

In the defect pixel correction circuit 1 and the defect pixel correcting method according to the first embodiment, when the direction where the noteworthy pixel oo, the referring pixels ko, mo, qo and so line up and the direction where the defect pixel lines up intersect, the possibility that the defect pixel is included in the noteworthy pixel oo becomes small. As a result, when noteworthy pixel oo is a defect pixel, the pixel value can be appropriately replaced with the correcting pixel value.

In the defect pixel correction circuit 1 according to the first embodiment, the direction where the noteworthy pixel oo, the referring pixels ko, mo, qo and so line up is a scanning direction of the image sensor. The data is sent from the image sensor to the scanning direction sequentially. As a result, the buffer only of "(number of lines that refers)×(horizontal number of pixels)" handled at a time is needed to store the noteworthy pixel oo, the referring pixel ko, mo, qo and so, when the direction where the noteworthy pixel oo, the referring pixel ko, mo, qo and so line up is a direction where the scanning direction intersects. On the other hand, the direction where the noteworthy pixel oo, the referring pixels ko, mo, qo and so line up can be finished by the buffer only to store the pixels ko to so of the same as the image sensor scanning direction.

In the defect pixel correction circuit 1 and the defect pixel correcting method according to the first embodiment, the defect pixel determination unit 10 includes the first guess pixel generation unit 101 and the second guess pixel generation unit 102 for guessing the guess pixel value of the pixel value of the noteworthy pixel oo from at least two pixel values from among the referring pixels ko, mo, qo and so by the collinear approximation. As a result, it can be determined in high accuracy whether it is a defect pixel in a smooth image with few noises.

In the defect pixel correction circuit 1 and the defect pixel correcting method according to the first embodiment, it is determined whether or not the noteworthy pixel is a defect pixel by using the left guess value SL and the right guess value SR generated from the first guess pixel generation unit 101 and the second guess pixel generation unit 102 when the discrimination modes DERMD is set to 0. As a result, it can be determined in high accuracy whether or not the noteworthy pixel oo is a defect pixel since it can use the approximation straight line generated with the minimum mean square method so forth in a smooth image with few noises.

Furthermore, since the first guess pixel value and the second guess pixel value are guessed by using only two pixel values respectively of the first referring pixel group and the second referring pixel group, and a straight line equation can be calculated by two points, it is possible to configure with a simple circuit.

In defect pixel correction circuit 1 and defect pixel correcting method according to the first embodiment, when the discrimination mode DERMD is set to 1, the pixel maximum value and the pixel minimum value are extracted from among the referring pixels ko, mo, qo and so, and then it is determined whether or not the noteworthy pixel is a defect pixel by using the extracted data. As a result, the circuit that determines whether it is a defect pixel even if it is an image with many noises that gets rough can be configured.

In the defect pixel correction circuit 1 and the defect pixel correcting method according to the first embodiment, when the discrimination mode DERMD is set to 2, the pixel maximum value and the pixel minimum value are extracted from among the left guess value SL, the right guess value SR, and the referring pixels ko, mo, qo and so, and then it is determined whether or not the noteworthy pixel is a defect pixel by using the extracted data. As a result, it can be determined in high accuracy whether or not the noteworthy pixel is a defect pixel in a smooth image with few noises, and it can be determined appropriately whether or not the noteworthy pixel is a defect pixel in an image with many noises that gets rough.

In the defect pixel correction circuit 1 and the defect pixel correcting method according to the first embodiment, the second threshold DERTHP is added to the pixel maximum value and the first threshold DERTHM is decreased from the pixel minimum value, and then the noteworthy pixel oo is determined as no defect pixel when the pixel value of noteworthy pixel oo is equal to or more than the result that the first threshold DERTHM is subtracted from the minimum value and the pixel value of noteworthy pixel oo is equal to or less than the result that the second threshold DERTHP is added to the maximum value. Moreover, it may contain the value of both ends, and it is not necessary to contain the value of both ends. As a result, it can more certainly be determined whether or not the noteworthy pixel oo is a defect pixel.

In the defect pixel correction circuit 1 and the defect pixel correcting method according to the first embodiment, when the correcting mode DERMN is set to 1, the average value of the referring pixels mo and qo is operated, and the correcting pixel is generated. Even if it is an image with many noises that gets rough, the defect pixel can be appropriately corrected by taking the average value of the referring pixels mo and qo.

In the defect pixel correction circuit 1 and the defect pixel correcting method according to the first embodiment, when the correcting mode DERMN is set to 0, the maximum value and the minimum value are extracted from the referring pixels mo and qo, and then it is supplemented by the maximum value or the minimum value determining as a result of the defect pixel determination unit 10. As a result, even if it is a smooth image with few noises, the defect pixel can be appropriately corrected.

Second Embodiment

Figure 6:
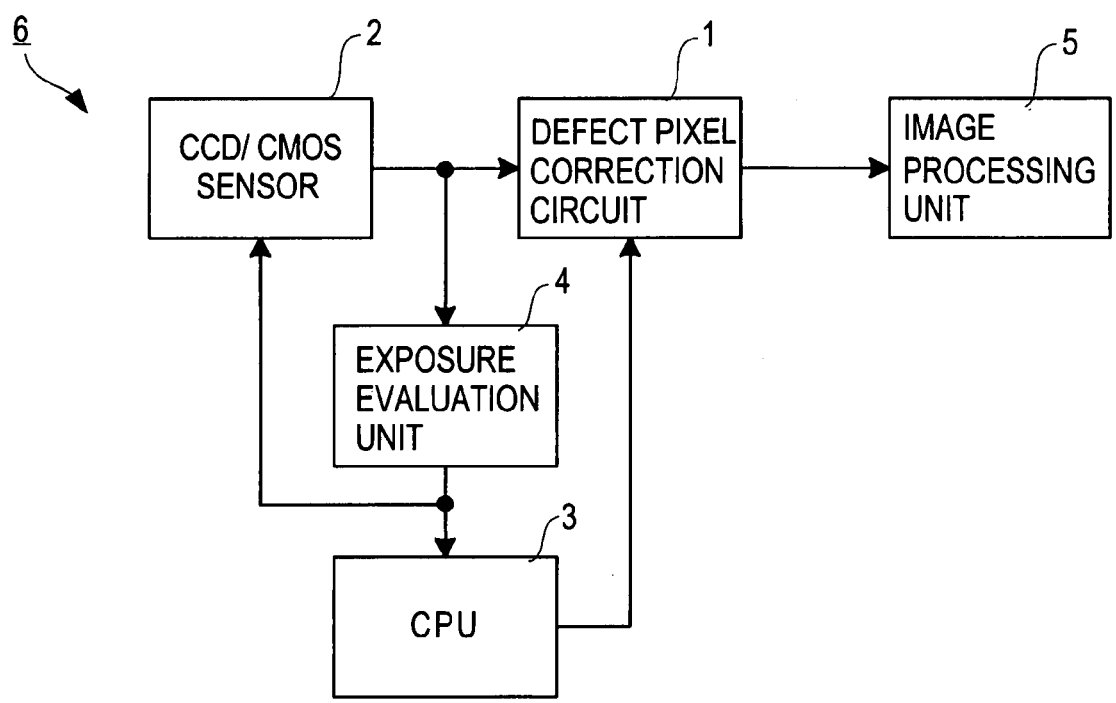
FIG. 6 is a functional block diagram showing a configuration of an image processing system according to the second embodiment.

FIG. 6 is a functional block diagram showing a configuration of an image processing system 6. The image processing system 6 includes a defect pixel correction circuit 1, a CMOS sensor 2, a CPU 3, an exposure evaluation unit 4, and an image processing unit 5.

Among these elements, since the defect pixel correction circuit 1, the CMOS sensor 2, and the CPU 3 are similar to the first embodiment, the explanation is simplified or is omitted.

In the exposure evaluation unit 4, the data of the bayer array pixel of the defect before adjustment is input, and the evaluation of the exposure is executed in proportion to the brightness of the data of the bayer array pixel. After the evaluation of the exposure, the ISO sensibility that is appropriate for taking picture is output.

In the CPU 3, the discrimination mode DERMD, the first threshold DERTHM, the second threshold DERTHP, and the correcting mode DERMN are set according to the ISO sensibility decided by the exposure evaluation unit 4.

As for the obtained image, the high sensitivity noise is included many when set up the sensibility ISO high (when the image is dark). Since the pixel value estimated from the inclination to the pixel value of the referring pixel becomes difficult in the image with many noises, the method of the discrimination mode DERMD=1 becomes inappropriate. For this case, the method of the discrimination mode DERMD=2 determined by the maximum value and the minimum value of the referring pixel group becomes appropriate. For the image to which the more high ISO sensibility is wanted, the method of discrimination mode DERMD=0 not determined the defect pixel easily becomes appropriate most. Moreover, it sets as high as the ISO sensibility with high the first threshold DERTHM and the second threshold DERTHP. The purpose of this is to prevent pixel correcting being done being misjudged the pixel with many noises to the defect pixel. In addition, about the defect pixel correcting operation, the correcting mode DERMN=1 that uses the average value is set when the ISO sensibility is high, and the correcting mode DERMN=0 that uses the minimum value and the maximum value is set when the ISO sensibility is low.

One example of setting up the discrimination mode DERMD, the first threshold DERTHM, the second threshold DERTHP and the correcting mode DERMN, corresponding to the ISO sensibility will be shown as follows.

When the ISO sensibility is less than 400, the discrimination mode DERMD is set to 1, the first threshold DERTHM is set to 400, the second threshold DERTHP is set to 400 and the correcting mode DERMN is set to 0.

When the ISO sensibility is equal to or more than 400 and less than 800, the discrimination mode DERMD is set to 2, the first threshold DERTHM is set to 600, the second threshold DERTHP is set to 600 and the correcting mode DERMN is set to 1.

When the ISO sensibility is equal to or more than 800, the discrimination mode DERMD is set to 0, the first threshold DERTHM is set to 800, the second threshold DERTHP is set to 800 and the correcting mode DERMN is set to 1.

In the image processing unit 5, the translation to RGB/JPEG and the filtering processing are executed to the pixel data of the bayer array from which the defect pixel is removed.

According to the image processing system according to the second embodiment, since the discrimination mode DERMD, the first threshold DERTHM and the second threshold DERTHP of the defect pixel determination unit 10 are set according to the detected ISO sensibility, the appropriate defect pixel can be corrected to the image to which the ISO sensibility is high and rough and the image that the ISO sensibility is low and smooth.

According to the image processing system according to the second embodiment, since the correction factor selection unit 204 of the defect pixel correcting unit 20 (correcting mode DERMN) is set according to the detected ISO sensibility, the appropriate defect pixel can be corrected to the image to which the ISO sensibility is high and rough and the image that the ISO sensibility is low and smooth.

It is needless to say that the present invention is not limited to the embodiments, and is possible various improvements and modifications by the range in which it does not deviate from the spirit of the invention.

For example, in this embodiment, although it explains the case where the image data input from the image sensor is bayer data, the present invention is not limited to this. It is needless to say to be able to apply the present invention also to the cases of the RGB data so forth other than bayer data similarly.

According to the present invention, it is possible to provide the defect pixel correction circuit that could easily determine the defect of the image sensor having a defect that ranges to one direction and replace with the correcting pixel, the image processing system using the defect pixel correction circuit and the defect pixel correcting method.

What is claimed is:

1. A defect pixel correction circuit comprising:
   a defect pixel determination unit configured to determine whether a noteworthy pixel is a defect pixel referring to a plurality of pixels of a referring pixel group that excludes the noteworthy pixel, the plurality of pixels and noteworthy pixel lining up in one direction, and the plurality of pixels being dividable into a first referring pixel group and a second referring pixel group; and
   a defect pixel correcting unit configured to generate a correcting pixel value on the basis of a first approximation from at least two pixels of the first referring pixel group, a second approximation from at least two pixels of the second referring pixel group, and replace a noteworthy pixel value that is pixel value of the noteworthy pixel with the correcting pixel value, when the noteworthy pixel is a defect pixel, wherein
   in the case where the noteworthy pixel is placed among the referring pixel group, one side is made the first referring pixel group, and the other side is made the second referring pixel group,
   the defect pixel correction circuit further comprises a guess pixel value generation unit configured to guess a guess pixel value that is a guess value of the noteworthy pixel value, the guess pixel value generation unit comprises:
   a first guess pixel value generation unit to which a first guess pixel value that is a guess value of the noteworthy pixel value is guessed from the first approximation by a collinear approximation;
   a second guess pixel value generation unit to which a second guess pixel value that is a guess value of the noteworthy pixel value is guessed from the second approximation by the collinear approximation;
   a first maximum value acquiring unit configured to extract a maximum value from among the first guess pixel value and the second guess pixel value;
   a first minimum value acquiring unit configured to extract a minimum value from among the first guess pixel value and the second guess pixel value;
   a second maximum value acquiring unit configured to extract a maximum value from among the referring pixel group;
   a second minimum value acquiring unit configured to extract a minimum value from among the referring pixel group;
   a third maximum value acquiring unit configured to extract a pixel maximum value that is a maximum value of as a result of the first maximum value acquiring unit and as a result of the second maximum value acquiring unit; and
   a third minimum value acquiring unit configured to extract a pixel minimum value that is a minimum value of as a result of the first minimum value acquiring unit and as a result of the second minimum value acquiring unit; and
   the defect pixel determination unit comprises a determination unit configured to determine whether the noteworthy pixel value is included from the pixel minimum value to the pixel maximum value.

2. The defect pixel correction circuit according to claim 1, wherein the direction where the noteworthy pixel and the referring pixel group line up is a scanning direction of the image sensor.

3. The defect pixel correction circuit according to claim 1, wherein:
   the first guess pixel generation unit guesses the first guess pixel value by the collinear approximation from the nearest two pixel values of the first referring pixel group; and
   the second guess pixel generation unit guesses the second guess pixel value by the collinear approximation from the nearest two pixel values of the second referring pixel group.

4. The defect pixel correction circuit according to claim 1, wherein
   the guess pixel value generation unit further comprises:
   a maximum value selection unit configured to select as a result of the first maximum value acquiring unit as a result of the second maximum value acquiring unit and as a result of the third maximum value acquiring unit as a pixel maximum value according to a state of a handled image; and
   a minimum value selection unit configured to select as a result of the first minimum value acquiring unit as a result of the second minimum value acquiring unit and as a result of the third minimum value acquiring unit as a pixel minimum value according to the state of the handled image.

5. The defect pixel correction circuit according to claim 1, wherein the determination unit comprises:
   a maximum threshold generation unit configured to add a first threshold to the pixel maximum value;
   a minimum threshold generation unit configured to decrease a second threshold from the pixel minimum value; and
   a threshold determination unit configured to determine whether the noteworthy pixel value is included from as a result of the maximum threshold generation unit to as a result of the minimum threshold generation unit.

6. The defect pixel correction circuit according to claim 1 wherein the defect pixel correcting unit comprises an average value operation unit configured to operate an average value of the referring pixel group, and assume the correcting pixel value.

7. The defect pixel correction circuit according to claim 1, wherein
   the defect pixel correcting unit comprises:
   a correction factor selection unit configured to select the maximum value of the referring pixel group as the correcting pixel value when the noteworthy pixel value is more than the maximum value of the determination by the defect pixel determination unit, and select the minimum value of the referring pixel group as the correcting pixel value when the noteworthy pixel value is less than the minimum value of the determination by the defect pixel determination unit.

8. The defect pixel correction circuit according to claim 1, wherein
   the defect pixel correcting unit comprises:
   an average value operation unit configured to operate an average value of the referring pixel group;
   a selection unit configured to select the maximum value of the referring pixel group when the noteworthy pixel value is more than the maximum value of the determination by the defect pixel determination unit, and select the minimum value of the referring pixel group when the noteworthy pixel value is less than the minimum value of the determination by the defect pixel determination unit; and a correction factor selection unit configured to select as a result of the average value operation unit and as a result of the selection unit as the correcting pixel value according to a handled image.

9. A defect pixel correcting method comprising:

determining whether a noteworthy pixel is a defect pixel referring to a plurality of pixels of a referring pixel group that excludes the noteworthy pixel, the plurality of pixels and noteworthy pixel lining up in one direction, and the plurality of pixels being dividable into a first referring pixel group and a second referring pixel group;

generating a correcting pixel value on the basis of a first approximation from at least two pixels of the first referring pixel group, and a second approximation from at least two pixels of the second referring pixel group, when the noteworthy pixel is a defect pixel; and replacing a noteworthy pixel value that is pixel value of the noteworthy pixel with the correcting pixel value, wherein in the case where the noteworthy pixel is placed among the referring pixel group, one side is made the first referring pixel group, and the other side is made the second referring pixel group, the determining includes:

guessing a first guess pixel value that is a guess value of the noteworthy pixel value from the first approximation by the collinear approximation;

guessing a second guess pixel value that is a guess value of the noteworthy pixel value from the second approximation by the collinear approximation;

extracting a first maximum value from among the first guess pixel value and the second guess pixel value;

extracting a first minimum value from among the first guess pixel value and the second guess pixel value;

extracting a second maximum value from among the referring pixel group;

extracting a second minimum value from among the referring pixel group;

extracting a pixel maximum value that is a maximum value of the first maximum value and the second maximum value; and extracting a pixel minimum value that is a minimum value of the first minimum value and the second minimum value; and the determining includes determining whether the noteworthy pixel value is included from the pixel minimum value to the pixel maximum value.

10. The defect pixel correcting method of claim 9 wherein the replacing includes:

operating an average value of the referring pixel group.

11. The defect pixel correcting method of claim 9 wherein the replacing includes:

selecting the maximum value of the referring pixel group as the correcting pixel value when the noteworthy pixel value is more than the maximum value of the determination by the determining; and selecting the minimum value of the referring pixel group as the correcting pixel value when the noteworthy pixel value is less than the minimum value of the determination by the determining.

* * * * *